J. B. OSLER.
AUTOMOBILE BED.
APPLICATION FILED NOV. 20, 1916.
1,266,042.
Patented May 14, 1918.
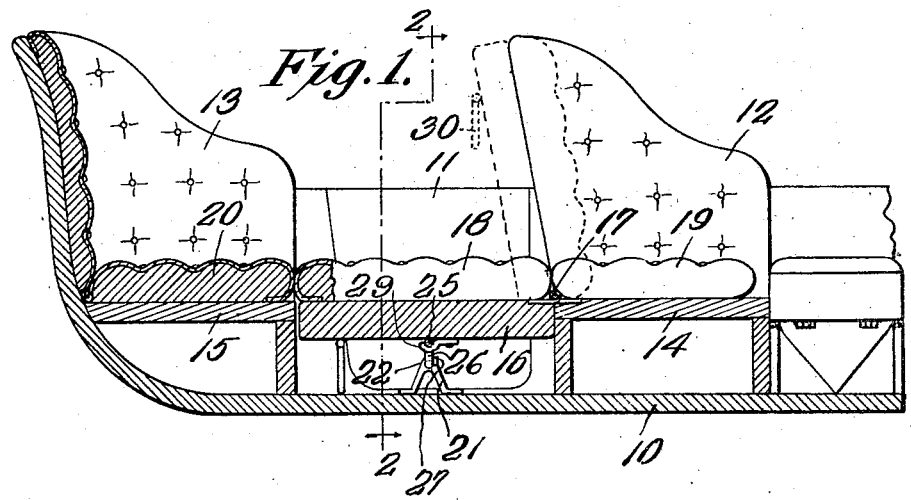
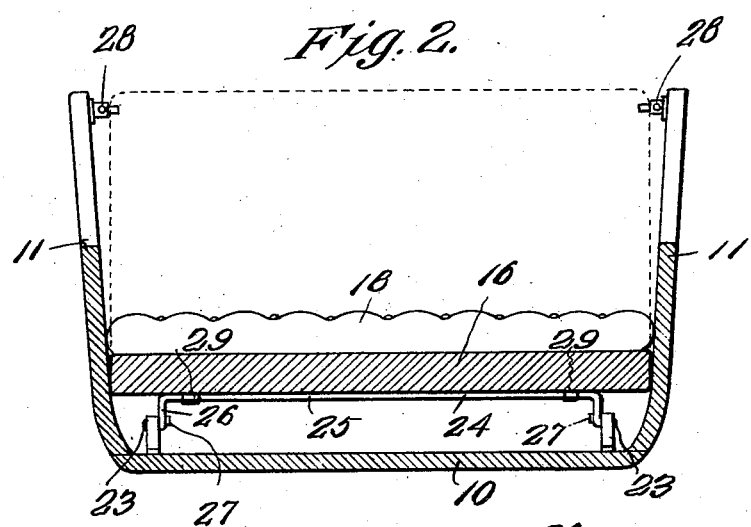
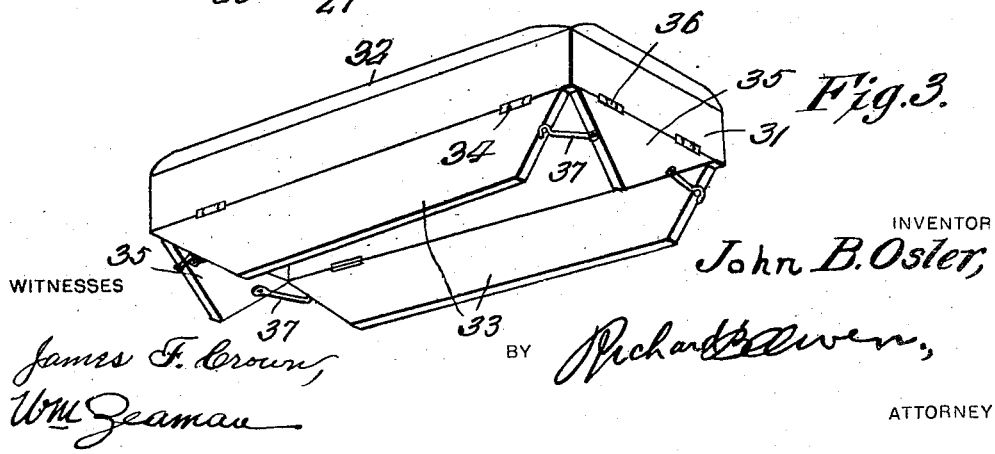
WITNESSES
James F. Crown,
Wm. Zeaman
INVENTOR
John B. Osler,
BY Richard B. Owen,
ATTORNEY

UNITED STATES PATENT OFFICE.

JOHN B. OSLER, OF KENESAW, NEBRASKA.

AUTOMOBILE-BED.

1,266,042. Specification of Letters Patent. Patented May 14, 1918.

Application filed November 20, 1916. Serial No. 132,440.

*To all whom it may concern:*

Be it known that I, JOHN B. OSLER, a citizen of the United States, residing at Kenesaw, in the county of Adams and State of Nebraska, have invented certain new and useful Improvements in Automobile-Beds, of which the following is a specification.

This invention has relation to passenger carrying motor vehicles, and has for an object to provide a car body including foldable seats whereby the seats may be arranged to provide a couch for sleeping purposes, or for converting the vehicle into an ambulance car to convey the sick or injured.

Another object of the invention is to provide a cushion embodying a folding support for use in connection with convertible seats of the character set forth above, whereby the carriage when formed may be extended for use in car bodies of short dimensions.

In addition to the foregoing my invention comprehends improvements in the details of construction and arrangement of parts to be hereinafter more fully described and particularly set forth in the appended claim.

In the accompanying drawings in which similar and corresponding parts are designated by the same characters of reference throughout the several views in which they appear:

Figure 1, is a longitudinal sectional view taken through a vehicle body illustrating the embodiment therein of my invention.

Fig. 2, is a transverse sectional view taken on the line 2—2 of the preceding figure, and Fig. 3, is a view in perspective of the auxiliary cushion.

With reference to the drawings, 10 and 11 indicate respectively the floor and side of a vehicle body of conventional type. The front and rear seats are indicated generally at 12 and 13, and the seat portions thereof respectively at 14 and 15.

The back of the front seat indicated at 16 is hingedly mounted at 17, to the rear edge of the front seat portion 14, and is adapted to be moved from a substantially vertical to a horizontal position as indicated in Fig. 1 of the drawings, and is provided upon its front face with a permanently affixed cushion 18. The seat portion 14 of the front seat is provided with a movable cushion 19, and the rear seat is permanently affixed to the car body and upholstered, as at 20.

In connection with a vehicle body including my improvements, I provide a foot rail adapted to be extended transversely of the car in front of the rear seat, which foot rail is substantially of a construction corresponding to the conventional type of foot rail and includes a transversely opposed standard 21 having bearings 22 at their upper portions for the reception of the outturned terminals 23 of a foot rail 24, which is in the form of a transversely extending rod 25 having rightangular terminals 26, the terminals 26 being formed with the journal 23 mentioned above. The bearings 22 of the standard 21 are formed with laterally extending lugs 27 whereby when the foot rail is disposed in a vertical position as illustrated in the drawings, the lugs 27 are engaged thereby to limit such movement.

When the vehicle body is employed during the day, the back 16 of the front seat is disposed in a substantially vertical position as illustrated in dotted lines in Fig. 1 and is retained in such position through the agency of spring catches 28 of conventional type secured to the inner sides 11 of the vehicle body. When however, it is desired to convert the seats into a couch for sleeping purposes, the back 16 of the front seat is lowered to a substantially horizontal position, and is rested upon the transversely extending rod 25 of the foot rest, and the maintenance of the foot rail in a vertical position is insured by spring clips 29 which are pivotally secured to the rear face of the back 16 and which are adapted to be engaged beneath and partly around said rod 25 of the foot rail by inserting the hand beneath the back through the door opening. The back 16 of the front seat should be of a height or width sufficient to extend between the rear edge of the seat portion 14 and the front edge of the rear seat portion 15, and when the movable cushion 19 of the front seat is moved rearward to engage the upholstering 18 of the back 16 a backwardly continued upholstered surface is provided upon which a person may recline. Thus, the foot rail may be utilized at one time in its ordinary capacity, and at other times as a support for the back of the front seat when the seats are to be converted into a couch. As an additional means of supporting the back 16 of the front seat, or as a means to be employed in lieu of the foot rail, the robe rail indicated at 30 secured to the rear face of back 16, adjacent its upper horizontal edge, may be of the hingedly mounted type, whereby it may extend downwardly and in contact with the floor 10 of the vehicle when the back 16 is disposed in a horizontal position.

For certain types of motor vehicles, of standard make, wherein the wheel base is comparatively short, it may be necessary to extend the reclining surface, and to that end I provide an auxiliary cushion or extension couch member set forth in Fig. 3, and illustrated in use in Fig. 1. The couch includes an elongated rectangular frame portion 31, suitably upholstered at 32 upon its upper surface and provided upon its lower longitudinal sides with supporting members 33 hingedly secured at 34 to the frame member 31 of the auxiliary couch member. Supports 35 are also hingedly secured as at 36 to the end members of the frame 31 and the supports are formed of such a configuration as to permit folding thereof toward each other to form the bottom of the couch member, or to be moved toward separation and disposed in substantially vertical position to support the frame 31 at an elevation above the floor of the vehicle. When the supporting members are thus extended, they may be retained in such position through the medium of hook latches 37, pivotally secured to one member and adapted to releasably engage a keeper upon the adjacent supporting member.

In use, the auxiliary cushion is adapted to be disposed transversely of the car, and at the front edge of the front seat portion 14, thereby forming a connection with the movable cushions 19 of the front seat and forming a continuous surface throughout the length of the car, thereby considerably elongating the couch.

Vehicle bodies of standard make may be altered to include a front seat constructed after the manner of my invention, or vehicle bodies may be especially manufactured embodying my improvement.

While I have illustrated and described my invention with some degree of particularity, I realize that in practice various alterations thereover may be made and I therefore reserve the right and privilege of changing the form of the details of constructions or otherwise altering the arrangement of the corelated parts without departing from the spirit of the invention or the scope of the appended claim.

Having thus described my invention what I claim as new and desire to secure by Letters Patent is:—

An automobile cushion including an upholstered covered rectangular box frame, supporting members for said frame including a pair of longitudinal boards hingedly connected to the box frame, the ends of the boards being beveled downward, and a triangular support hingedly mounted on each end of the frame, hook members pivotally mounted on the end supports, and catches on the ends of the longitudinal members engaged by the hook supports to retain the supports in an extended position when the cushion is in use, the supports being foldable beneath the frame to lie in a flat plane when the cushion is not in use.

In testimony whereof I affix my signature in presence of two witnesses.

JOHN B. OSLER.

Witnesses:
A. J. YOUNG,
WALTER E. NOWERS.

Copies of this patent may be obtained for five cents each, by addressing the "Commissioner of Patents, Washington, D. C."